(12) United States Patent  
Ishizaki et al.

(10) Patent No.: US 6,654,338 B2  
(45) Date of Patent: Nov. 25, 2003

(54) DISK CARTRIDGE

(75) Inventors: Osamu Ishizaki, Akeno-machi (JP); Minoru Fujita, Moriya-machi (JP); Satoshi Yamagata, Toride (JP)

(73) Assignee: Hitachi Maxell, Ltd., Osaka (JP)

( * ) Notice: Subject to any disclaimer, the term of this patent is extended or adjusted under 35 U.S.C. 154(b) by 208 days.

(21) Appl. No.: 09/878,975

(22) Filed: Jun. 13, 2001

(65) Prior Publication Data

US 2002/0024926 A1 Feb. 28, 2002

(30) Foreign Application Priority Data

Jun. 13, 2000 (JP) .................................. 2000-177312

(51) Int. Cl.[7] .............................................. G11B 23/03
(52) U.S. Cl. ...................................... 369/291; 360/133
(58) Field of Search ............................ 360/133; 369/291

(56) References Cited

U.S. PATENT DOCUMENTS

| | | | | |
|---|---|---|---|---|
| 5,548,577 A | * | 8/1996 | Miyazaki et al. | 369/291 |
| 5,691,860 A | * | 11/1997 | Hoppe | 360/133 |
| 6,205,115 B1 | * | 3/2001 | Ikebe et al. | 369/291 |
| 6,404,731 B2 | * | 6/2002 | Seo et al. | 369/291 |
| 6,463,028 B1 | * | 10/2002 | Koshiyouji | 369/291 |
| 6,493,314 B2 | * | 12/2002 | Nakatsu et al. | 369/291 |
| 6,529,471 B1 | * | 3/2003 | Lim et al. | 369/291 |

FOREIGN PATENT DOCUMENTS

| | | |
|---|---|---|
| JP | 426463 | 3/1992 |
| JP | A8235638 | 9/1996 |

* cited by examiner

*Primary Examiner*—Allen Cao  
(74) *Attorney, Agent, or Firm*—Birch, Stewart, Kolasch & Birch, LLP

(57) ABSTRACT

There is provided a disk cartridge adaptable to an enlarged head by exposing an information recording disk extensively out of a cartridge case. In the disk cartridge, a cartridge case is divided on its plane into at least a first case portion and a second case portion, and the second case portion is arranged to be slidable relative to the first case portion. When the disk cartridge is not in use, the information recording disk is enabled to be covered by the first case portion and the second case portion by keeping the first case portion and the second case portion in a parallel state, and a disk freeing portion is so formed that, when the disk cartridge is in use, exposes parts of both inside face and outside face of the information recording disk are exposed from the cartridge case by moving the second case portion relative to the first case portion and overlapping the first case portion and the second case portion.

16 Claims, 13 Drawing Sheets

DISK CARTRIDGE

BACKGROUND OF THE INVENTION

The present invention relates to a disk cartridge, such as an optical disk cartridge or a magnetic disk cartridge and the like, and more particularly to the structure of a disk cartridge in which a large type head may be used.

In recent years, along with the accelerating development of multimedia, optical information recording drives capable of recording a large quantity of data in high density and reproducing them at high speed are attracting a great deal of attention. These optical information recording drives include a read-only type optical disk, such as a CD or a laser disk, on which information is stamped on the disk at the time of producing the disk which thereafter permits only reproduction of the recorded information, a write-once type optical disk, such as a CD-R, which permits only once recording, and a rewritable type optical disk which permits rewriting and erasing of data without limitation by utilizing photo-magnetic recording or phase change recording. Of these available types of optical information recording drives, optomagnetic recording drives are mainly used in the field where a high data transfer rate is required.

Recording and reproduction of data use a light spot obtained by narrowing down a laser beam to the diffraction limit of the lens. The size of this light spot is almost equal to $\lambda/NA$, where $\lambda$ is the wavelength of the laser beam and NA, the numerical aperture of the lens. Recording and reproduction in higher density, i.e. of a smaller pattern, requires a correspondingly smaller light spot.

In order to reduce the size of the light spot, the numerical expression of $\lambda/NA$ teaches two manners: one decreasing the wavelength $\lambda$ of the laser beam, and the other of increasing the numerical aperture NA of the lens. The lens numerical aperture NA, represented by $NA = \sin\theta$ where $\theta$ is the half diaphragm angle, is smaller than 1.

In any optical information recording drive currently in practical use, the numerical aperture NA of the objective lens is at most about 0.6. This is because, as the numerical aperture NA increases, the coma and the astigmatism aberrations become greater in a state wherein the optical axis of the objective lens is inclined with respect to the substrate.

In order to solve this problem, it is essential not only to reduce the thickness of the transparent layer which the light passes (corresponding to the thickness of the transparent substrate in conventional optical information recording drives) but also to prevent the optical axis of the objective lens from being inclined with respect to the transparent substrate. For this purpose, there is proposed an optical information recording medium, together with a manufacturing method thereof, having grooves and pits for obtaining signals at the time of tracking and address signals formed on the transparent substrate, a recording layer including a reflective layer formed over them and a transparent resin layer of about 0.1 mm in thickness further formed over it. Recording and reproduction of information are accomplished by pressing a slider which mounts an objective lens and the like, against the surface of the transparent resin layer of this information recording medium (see JP-A-8-235638).

This optical information recording medium, however, there arises a problem that, because the slider is moved while being pressed against the transparent resin layer, the friction between the slider and the transparent resin layer is apt to result in scratching the transparent resin layer.

Moreover, the transparent resin layer over the recording layer is formed by either spin-coating it with ultraviolet setting resin or adhering a transparent resin film to it. Where a transparent resin film is to be adhered, it has to be ensured that no air pockets or bubbles are formed between the film and the recording layer, but this requirement poses a productivity problem.

Furthermore, where the ultraviolet setting resin coat is to be formed in a thickness of about 0.1 mm, the viscosity of the resin should be set considerably higher than usual, because this thickness is about five to ten times as great as the 10 to 20 $\mu$m thickness of a usual protective layer for an optical information recording medium. In this case, there are problems about the uniformity of the transparent resin layer and of possible generation of bubbles from air rolled in, which entail productivity and yield implications as in the case of adhering a transparent resin film.

On the other hand, a near field optical recording/reproducing system is proposed, by which light is focused on an information recording medium via a solid hemispherical lens (SIL), the distance between the SIL and the surface of the optical information recording medium is set to be about ¼ $\lambda$ ($\lambda$ is the wavelength of the laser beam), and the NA of the objective lens is effectively enhanced by using near field light (see U.S. Pat. No. 5,125,750).

However, in this system again, where the wavelength of the laser beam is 650 nm, the distance between the bottom surface of the SIL and the surface of the optical information recording medium is as little as 160 nm, which implies the problem of possible scratching of the surface of the optical information recording medium by the SIL. As a consequence, the cartridge to accommodate the disk has to be designed to minimize sticking of dust to the disk surface when the disk is not in use.

On the other hand, these recording systems allow recording onto and reproduction from both sides of the disk. However, this entails doubling of the height and size of the head, which is particularly unavoidable in the optical assist magnetic recording/reproducing technology, which is expected to make possible even higher density for information recording media.

This optical assist magnetic recording/reproducing technology is intended to achieve both high line recording density, an advantage of vertical magnetic recording, and high track density, a feature of optical recording by irradiation with a laser beam in an assisting way at the time of vertical recording/reproduction (see the Journal of the Magnetics Society of Japan, Vol. 23, No. 8, 1999).

This problem has led to a requirement for a disk cartridge having a large head inlet, but a conventional disk cartridge has a rectangular head inlet formed as a block in a prescribed position of a cartridge case. Where an enlarged head is to be used on account of the above-described background circumstance, the surrounding portions of the case demarcating the head inlet would pose obstacles, which a disk cartridge loaded into the recording/reproducing apparatus might collide against and thereby give rise to various troubles.

FIGS. 19 and 20 are drawings illustrative of a disk cartridge proposed in the Japanese Utility Model Laid-Open No. 4-26463 specification. This disk cartridge is provided with an upper case 100a and a lower case (not shown) constituting a cartridge case 100 and to be separable from each other in the vertical direction. In respectively prescribed positions of the cartridge case 100, there are formed a head insertion inlet 101 and a spindle insertion inlet 105, and a recording disk 102 is accommodated rotatably within the cartridge case 100.

A shutter 103 for opening and closing the head insertion inlet 101 is arranged slidably on the cartridge case 100. When a disk cartridge is inserted into a disk drive unit, the shutter 103 shifts in a direction orthogonal to the direction of disk cartridge insertion, and the head insertion inlet 101 and the spindle insertion inlet 105 are opened. To the front and rear ends of the shutter 103 is connected a slider 104 to make the shutter 103 more slidable. The upper case 100a and the lower case are elastically energized by a spring member (not shown) in the direction of joining each other, and at the same time they are separated in the vertical direction by the shifting of the slider 104.

This disk cartridge involves an inconvenience that, where a larger head is to be used, the surrounding portions of the case demarcating the head insertion inlet 101 would pose obstacles, and the head might collide against those case portions. One of the reasons of impossibility to widen the head insertion inlet 101 is related to the shutter 103.

That is, while the shutter 103 shifts in a direction orthogonal to the direction of disk cartridge insertion to open or close the head insertion inlet 101, the head insertion inlet 101 is formed in the central part of the cartridge case 100 as its location is conditioned by its positional relationship with the head, and full closing of the head insertion inlet 101 requires a slightly greater width of the shutter 103 than that of the head insertion inlet 101. On the other hand, full opening of the head insertion inlet 101 requires a space for use in standing by wider than the shutter 103 beside the head insertion inlet 101 to let the shutter to shut. At the same time, the width of the cartridge case 100 is determined by its relationship with the disk drive unit, and the above-noted requirements eventually limit the width of the head insertion inlet 101 and make it difficult to use a large enough head.

SUMMARY OF THE INVENTION

The object of the present invention is intended to remove such defects of the prior art and provide a disk cartridge made adaptable to an enlarged head as well by letting a large portion of the recording disk be exposed out of the cartridge case.

In order to attain the above-noted object, first means according to the present invention is a disk cartridge provided with a recording disk and a cartridge case for accommodating that recording disk, in which: the cartridge case is divided on its plane into at least a first case portion and a second case portion, and the second case portion is arranged slidably relative to the first case portion; the recording disk is enabled to be covered by the first case portion and the second case portion by keeping the first case portion and the second case portion in a parallel state when the disk cartridge is not in use; and, when the disk cartridge is in use, a disk freeing portion wherein parts of both inside face and outside face of the recording disk are exposed from the cartridge case by moving the second case portion relative to the first case portion.

Second means according to the present invention is a version of the first means in which the second case portion shifts in the direction reverse to the direction of disk cartridge insertion into a disk drive unit.

Third means according to the present invention is a version of the second means in which the ratio of the width L1 of the disk freeing portion in the direction orthogonal to the shifting direction of the second case portion to the width L2 of the disk cartridge in the direction orthogonal to the shifting direction of the second case portion (L1/L2) surpasses 0.5.

Fourth means according to the present invention is a version of the first means in which guide members protrude in parallel with each other in the same direction from both sides of the first case portion, the second case portion are supported by the guide members and, by shifting the second case portion relative to the first case portion, the disk freeing portion is formed inside the guide members.

Fifth means according to the present invention is a disk cartridge provided with a recording disk and a cartridge case for accommodating that recording disk, in which: a disk freeing portion wherein parts of both inside face and outside face of the recording disk are exposed is formed toward the tip of the cartridge case, a shutter for opening and closing the disk freeing portion is fitted shiftably to the cartridge case so as to shift in the direction reverse to the direction of disk cartridge insertion into the disk drive unit, and the ratio of the width L3 of the disk freeing portion in the direction orthogonal to the shifting direction of the shutter to the width L4 of the disk cartridge in the direction orthogonal to the shifting direction of the shutter (L3/L4) surpasses 0.5.

Sixth means according to the present invention is a version of the fifth means in which the size of the shutter does not permit it to project from the rear end of the cartridge case when the disk freeing portion is opened.

Seventh means according to the present invention is a version of the sixth means in which a stopper section for regulating the opening position of the shutter is provided at the rear end of the cartridge case.

Eighth means according to the present invention is a version of the sixth means in which a spindle insertion inlet is formed in the cartridge case, a hub is fitted in the central part of the recording disk and, when the disk cartridge is not in use, the hub blocks the spindle insertion inlet.

Ninth means according to the present invention is a version of the fifth means in which an end blocking piece for covering sides of the disk freeing portion is provided at the tip of the shutter, and the end blocking piece is elastically energized in the direction of covering the sides of the disk freeing portion.

Tenth means according to the present invention is a version of the fifth means in which a linking portion having substantially the same thickness as the recording disk is provided integrally toward the tip of the cartridge case so as to stride over the disk freeing portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
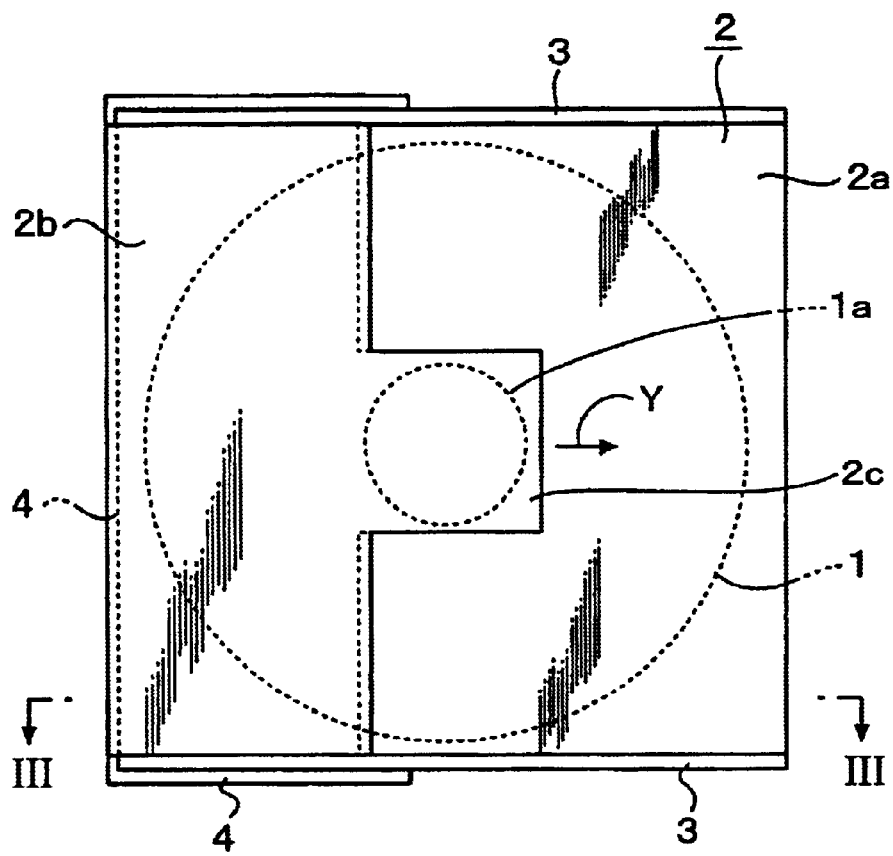
FIG. 1 is a plan view of a disk cartridge in a preferred embodiment of the present invention, when not in use.
Figure 2:
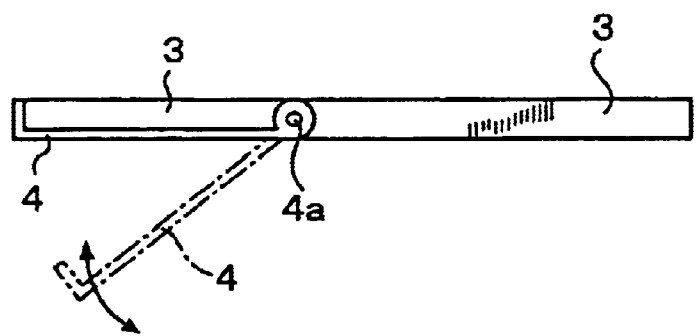
FIG. 2 is a side view of the disk cartridge illustrating how its side lid is opened and closed.
Figure 3:
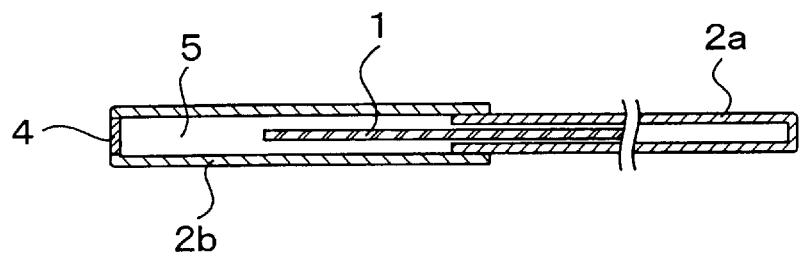
FIG. 3 illustrates a cross-sectional view taken on line III—III of the disk cartridge shown in FIG. 1.
Figure 4:
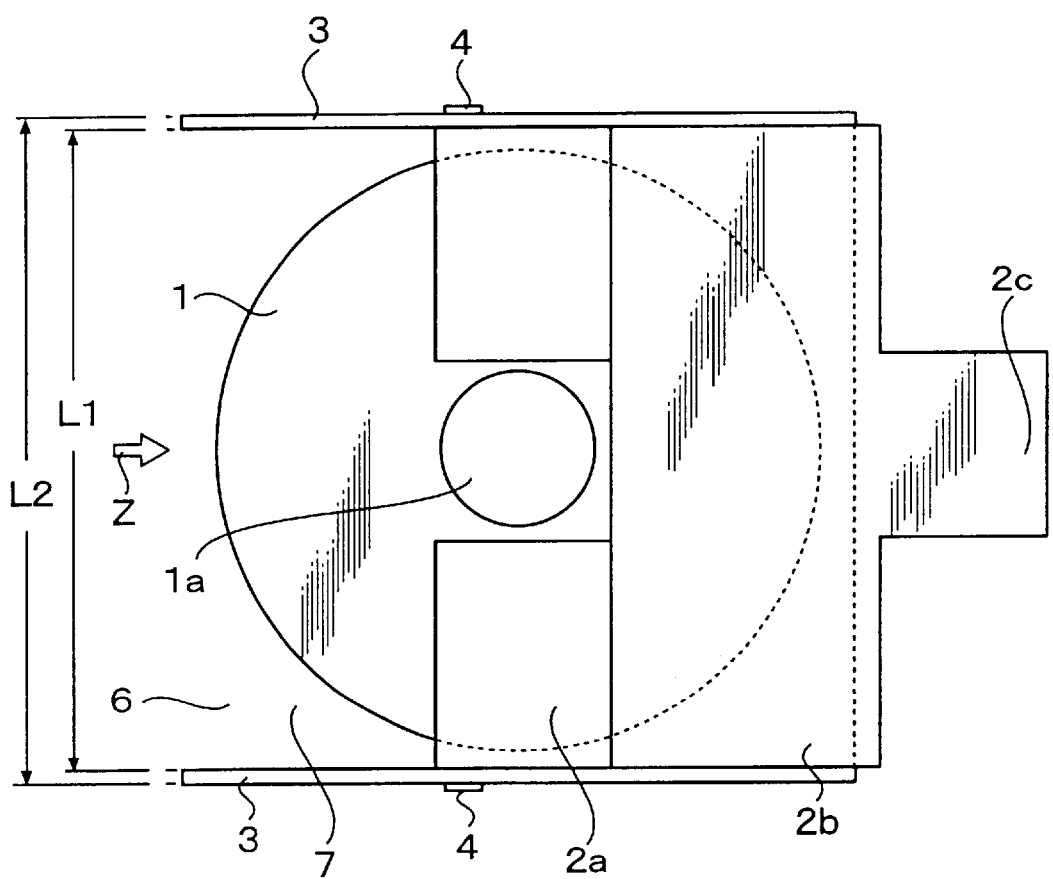
FIG. 4 is a plan of the disk cartridge when in use.

A preferred embodiment of the present invention will be described in detail below with reference to the accompanying drawings. FIGS. 1–4 are views illustrative of a disk cartridge of a first preferred embodiment of the present invention, FIG. 1 is a plan view of the disk cartridge in a preferred embodiment of the present invention, when not in use; FIG. 2 is a side view of the disk cartridge illustrating how its side lid is opened and closed; FIG. 3 illustrates a cross-sectional view taken on line III—III of the disk cartridge shown in FIG. 1; and FIG. 4 is a plan view of the disk cartridge when in use.

The disk cartridge is provided with a recording disk 1 having a hub 1a at the center and a cartridge case 2 rotatably accommodating the recording disk 1. The cartridge case 2 is bisected on its plane into a first case portion 2a and a second case portion 2b. The second case portion 2b is arranged to be slidable relative to the first case portion 2a by a pair of guide members 3 extending in parallel to each other. The guide members 3 protrude from both sides of the first case portion 2a in the same direction.

There is further provided a side opening/closing lid 4 one end of which is pivoted by the guide members 3 around a fulcrum shaft 4a (see FIG. 2) to open and close one side end (the end face where the information recording disk 1 is exposed) of the second case portion 2b.

In this embodiment, the first case portion 2a has a U-shaped section as shown in FIG. 3, while the second case portion 2b is a flattened cylinder, and its end face opening on the side farther from the first case portion 2a is opened and closed by the side opening/closing lid 4. A protruding portion 2c covering the hub 1a is provided about in the middle of the second case portion 2b as illustrated in FIG. 1.

Next, the operation of this disk cartridge will be described. When the disk cartridge is not in use, the first case portion 2a and the second case portion 2b are in a parallel manner with their end portions partially overlaping each other as illustrated in FIGS. 1 and 3. In this state, the side opening/closing lid 4 is closed, and the information recording disk 1 is accommodated in an internal space 5 defined by the first case portion 2a, the second case portion 2b and the side opening/closing lid 4.

When the disk cartridge is in use, the side opening/closing lid 4 is opened as indicated by chain line in FIG. 2 to push the second case portion 2b rightward in FIGS. 1 and 3. Then the second case portion 2b, guided by the guide members 3, moves rightward relative to the first case portion 2a, so that the second case portion 2b overides as shown in FIG. 4.

In this state, a disk freeing portion 7 is formed within the guide members 3 and 3; the parts of the upper and lower faces of the recording disk 1 covered by the second case portion 2b until then are extensively exposed out of the cartridge case 2, and the hub 1a is also exposed. The ratio of the width L1 of the disk freeing portion 7 in the direction orthogonal to the shifting direction of the second case portion 2b to the width L2 of the disk cartridge in the direction orthogonal to the shifting direction of the second case portion 2b (L1/L2) surpasses 0.5 and, in the case of this embodiment, the balance of the subtraction of the thickness of the two guide members 3 from the width L2 of the disk cartridge is the width L1 of the disk freeing portion 7, which has a free width close to the width L2 of the disk cartridge. Then, the hub 1a, magnetically chucked onto the spindle of the disk drive unit, is driven rotationally, and the head (not shown), entering from the open side 6 of the cartridge case 2 in the direction of an arrow Z, records or reproduces information onto or out of the information recording disk 1.

Since the information recording disk 1 is extensively exposed out of the cartridge case 2 during recording or reproduction, there is no risk of collision between the head and the cartridge case 2 when the disk cartridge is in use even if the head is enlarged in size.

The actions of the second case portion 2b and the side opening/closing lid 4 in ejecting the disk cartridge out of the disk drive unit are exactly inverse to those in inserting the disk cartridge.

Figure 5:
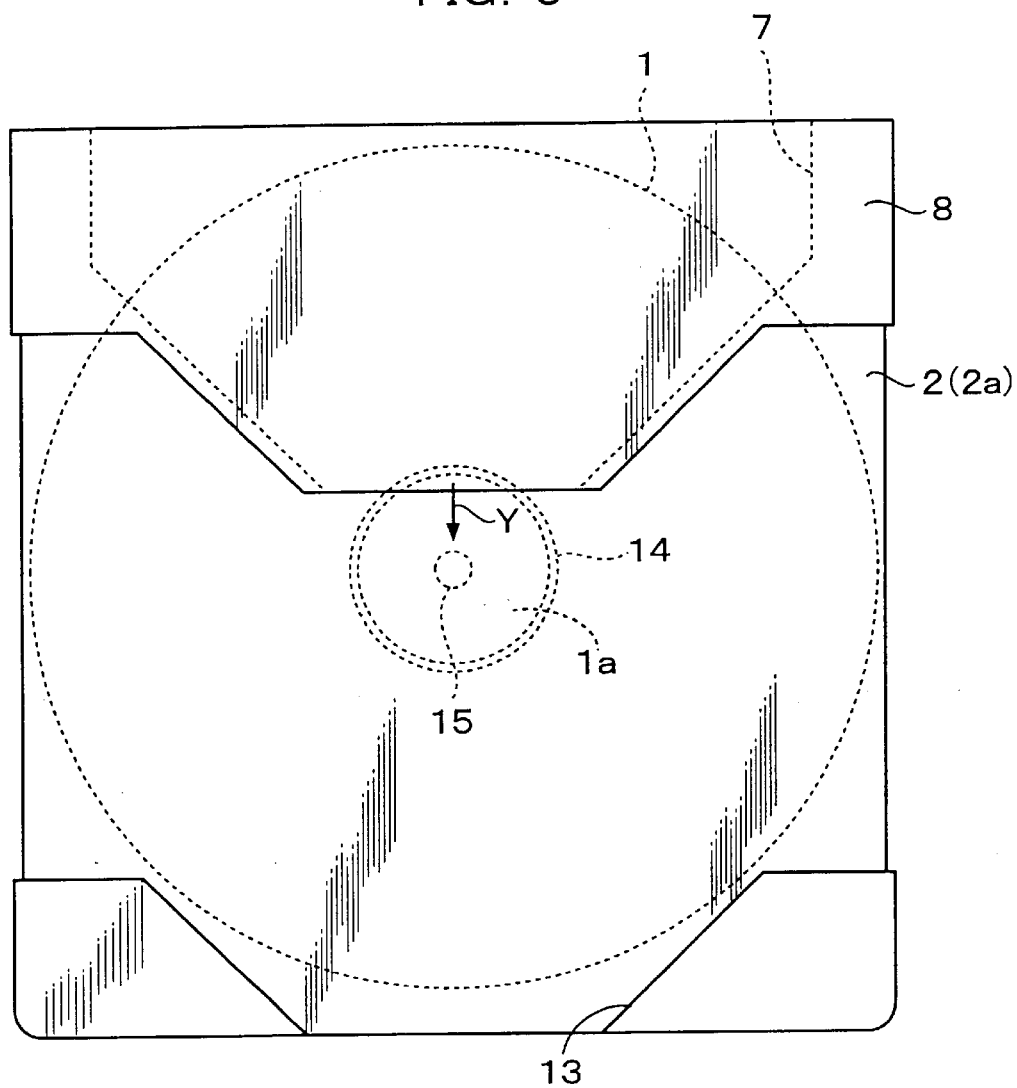
FIG. 5 is a plan of the disk cartridge, which is a second preferred embodiment of the invention, when not in use.
Figure 6:
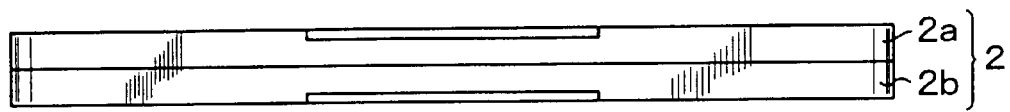
FIG. 6 shows a back view of the disk cartridge.
Figure 7:
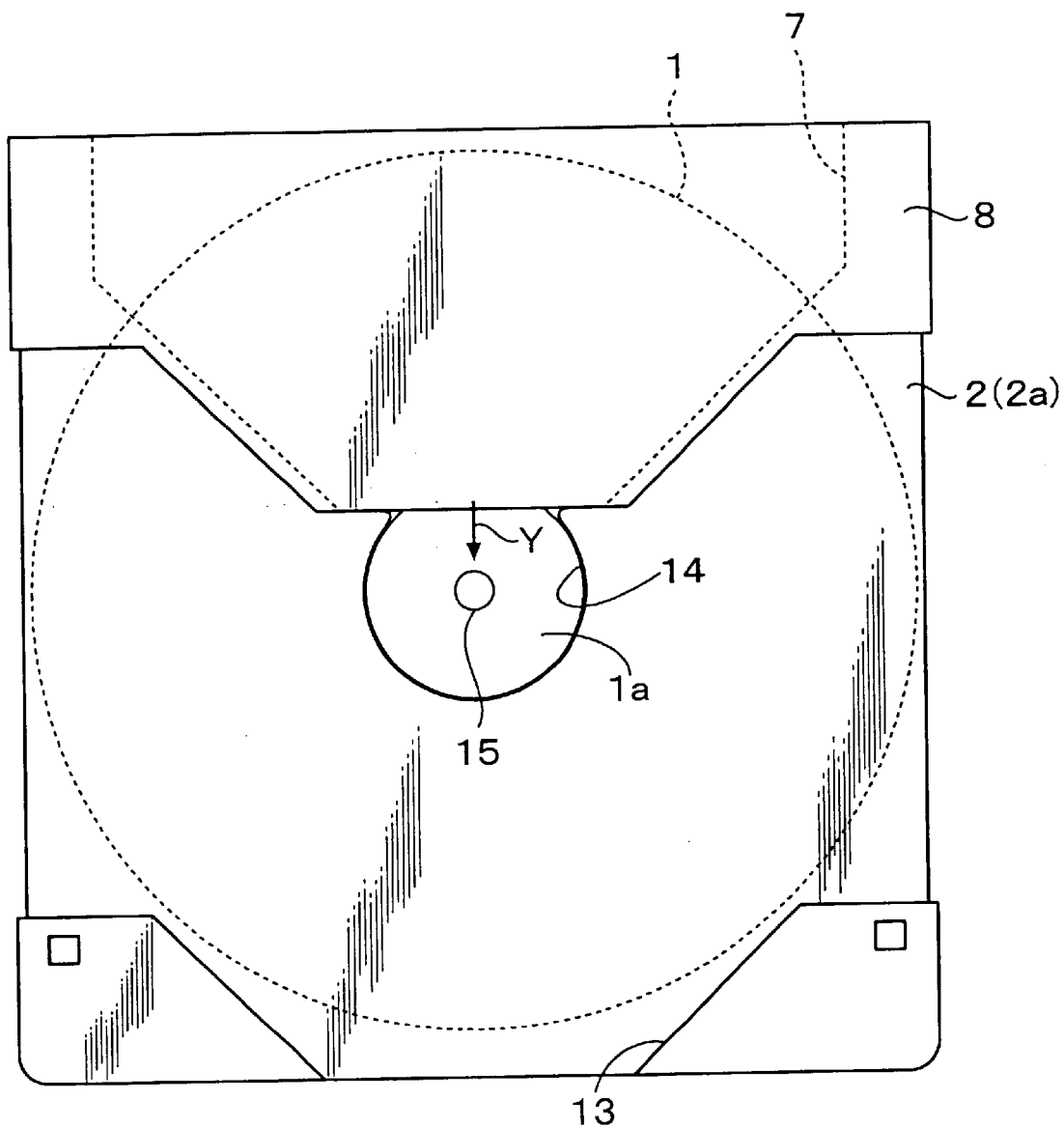
FIG. 7 shows a bottom view of the disk cartridge when not in use.
Figure 8:
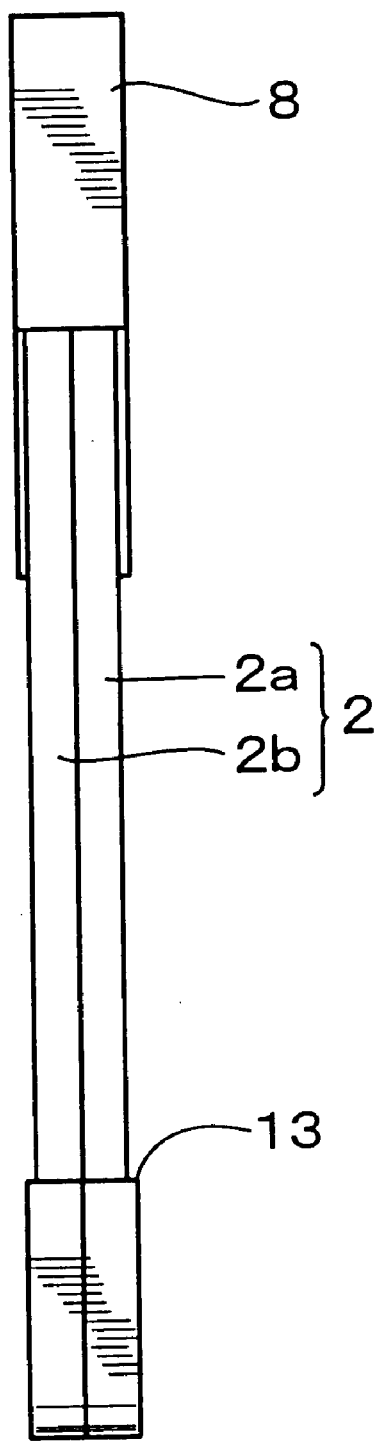
FIG. 8 shows a profile of the disk cartridge when not in use.
Figure 9:
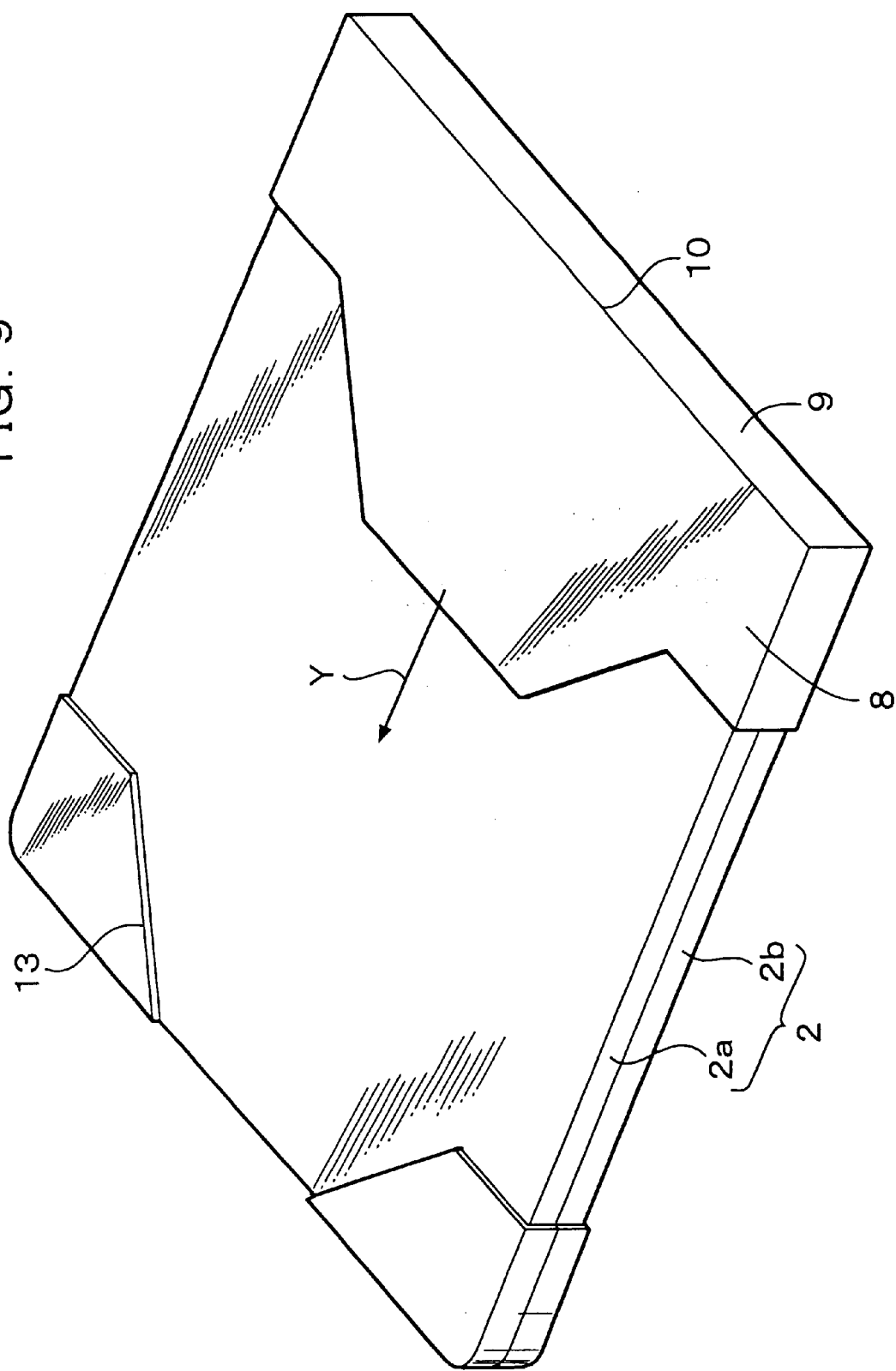
FIG. 9 shows a perspective view of the disk cartridge when not in use.
Figure 10:
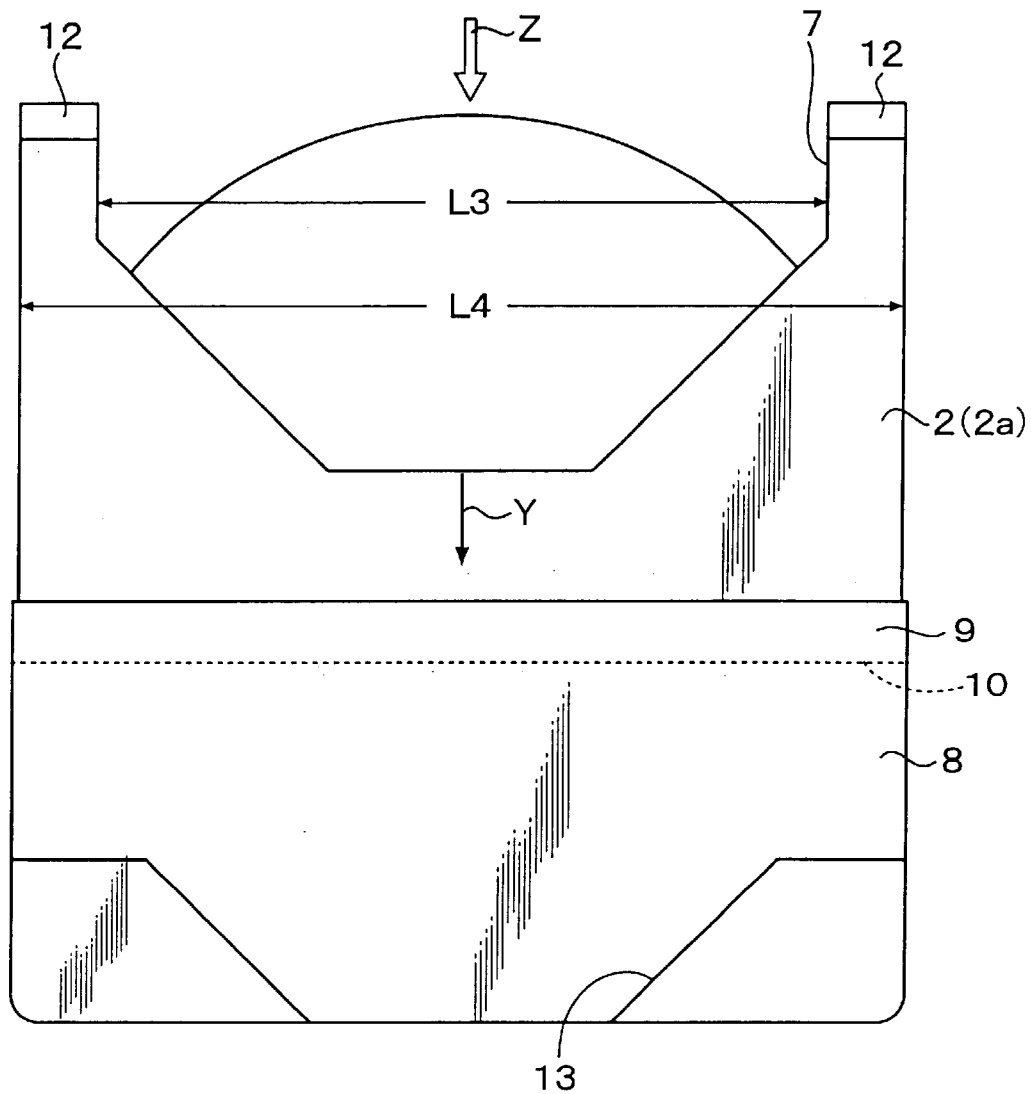
FIG. 10 shows a plan of the disk cartridge when in use.
Figure 11:
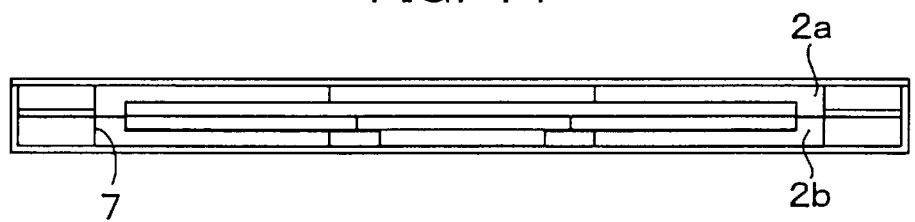
FIG. 11 shows a front view of the disk cartridge when in use.
Figure 12:
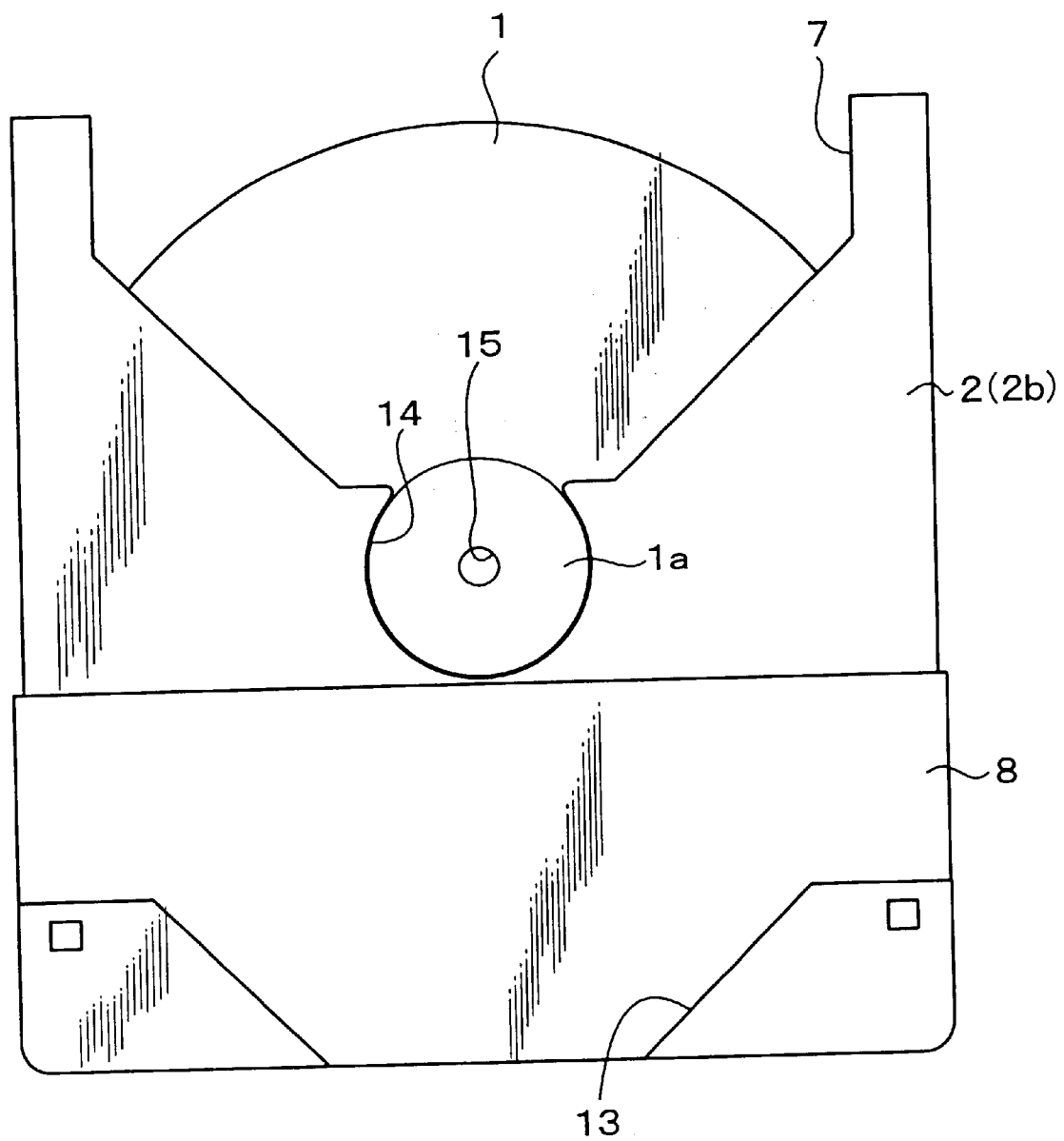
FIG. 12 shows a bottom view of the disk cartridge when in use.
Figure 13:
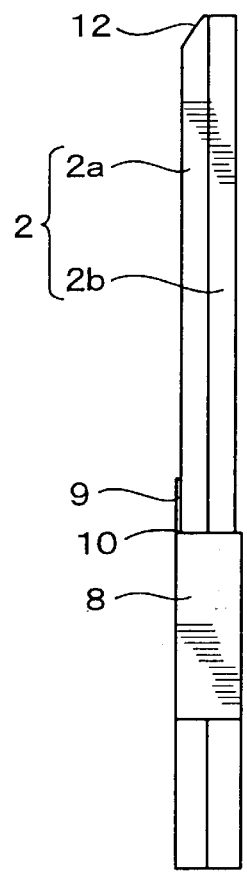
FIG. 13 shows a profile of the disk cartridge when in use.
Figure 15:
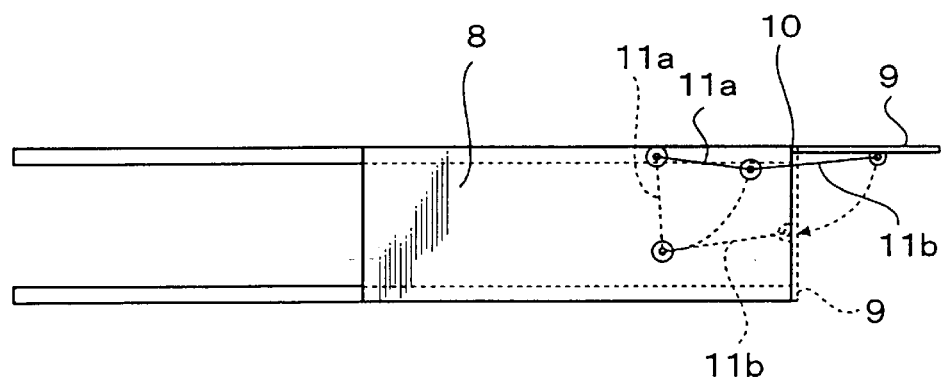
FIG. 15 is an expanded profile of a shutter for use with the disk cartridge.
Figure 14:
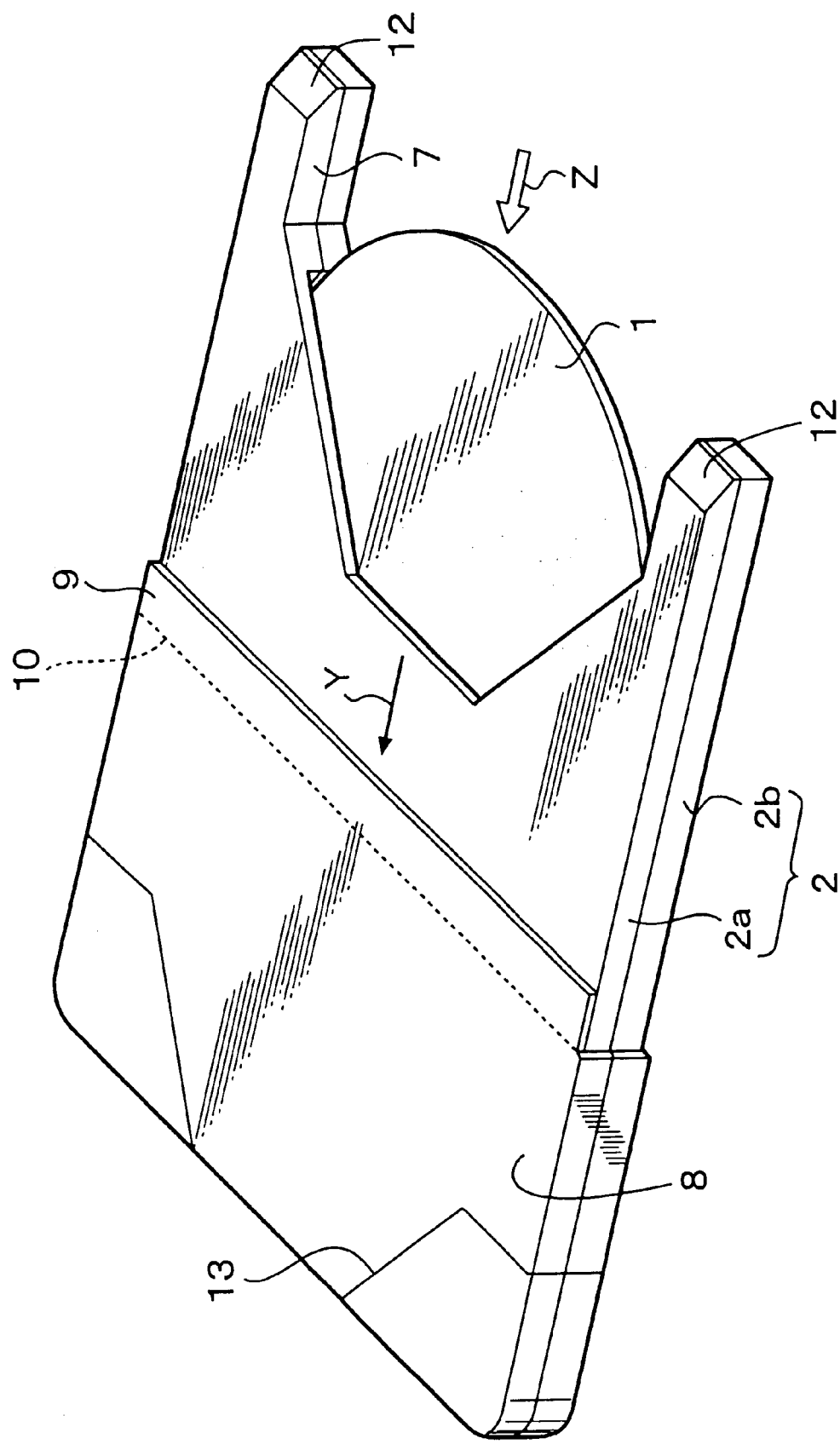
FIG. 14 shows a perspective view of the disk cartridge when in use.
Figure 16:
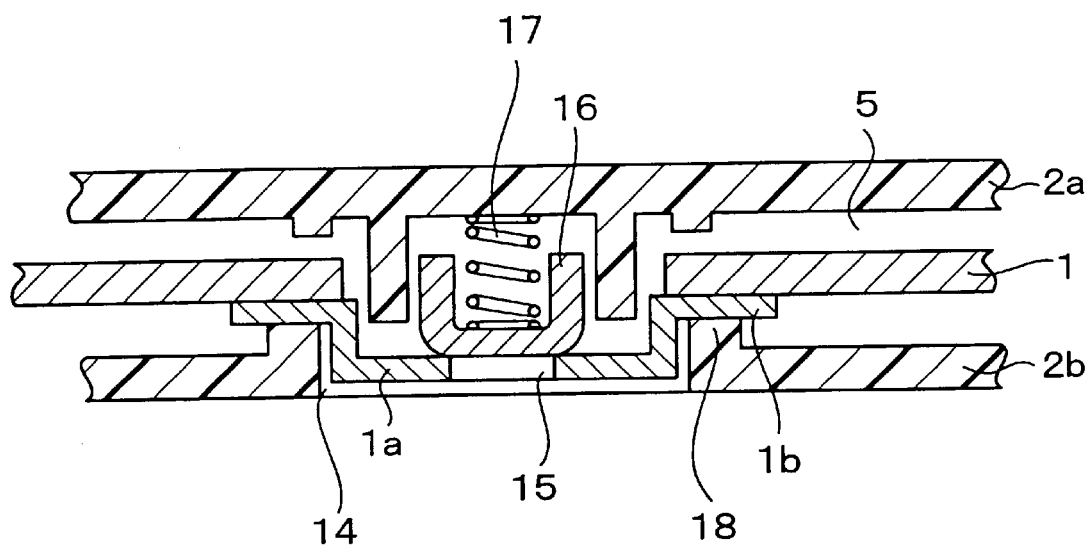
FIG. 16 shows an expanded section of the vicinity of a hub when the disk cartridge is not in use.
Figure 17:
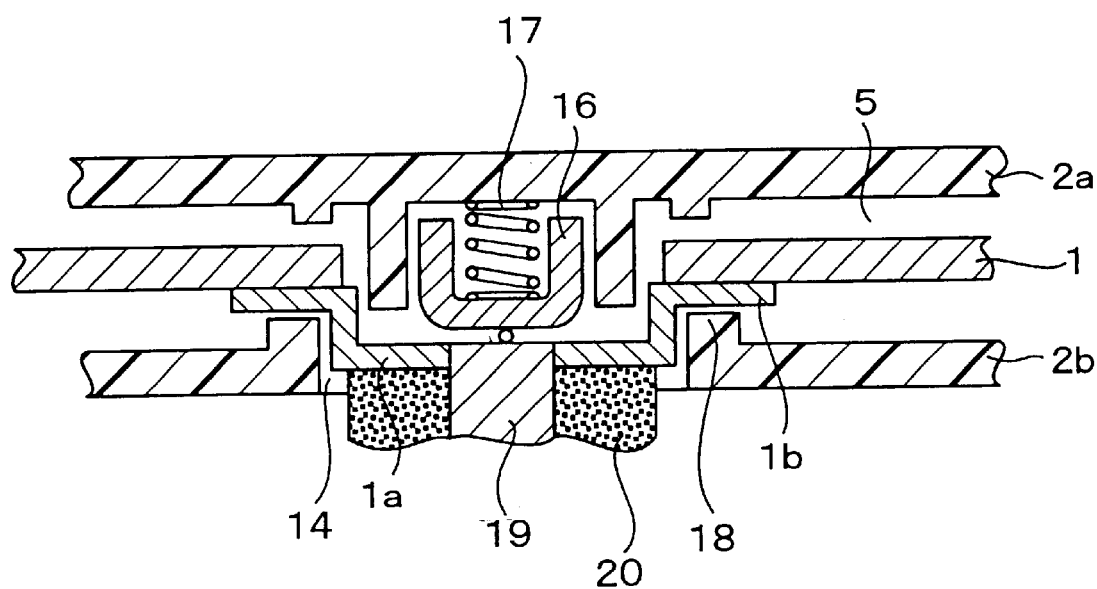
FIG. 17 shows an expanded section of the vicinity of the hub when the disk cartridge is in use.

FIGS. 5–17 illustrate a disk cartridge, which is a second preferred embodiment of the present invention. FIG. 5 is a plan of the disk cartridge when not in use; FIG. 6 shows a back view of the disk cartridge; FIG. 7 shows a bottom view of the disk cartridge when not in use; FIG. 8 shows a profile of the disk cartridge when not in use; and FIG. 9 shows a perspective view of the disk cartridge when not in use. FIG. 10 shows a plan of the disk cartridge when in use; FIG. 11 shows a front view of the disk cartridge when in use; FIG. 12 shows a bottom view of the disk cartridge when in use; FIG. 13 shows a profile of the disk cartridge when in use; and FIG. 14 shows a perspective view of the disk cartridge when in use. FIG. 15 is an expanded profile of a shutter for use with the disk cartridge; FIG. 16 shows an expanded section of the vicinity of a hub when the disk cartridge is not in use; and FIG. 17 shows an expanded section of the vicinity of the hub when the disk cartridge is in use. In FIG. 11, the illustration of the recording disk and the hub section is dispensed with, because their inclusion would make the drawing too complex.

The disk cartridge is provided with a recording disk 1 having a hub 1a at the center and a cartridge case 2 accommodating the recording disk 1. The cartridge case 2 consists of a first case portion 2a and a second case portion 2b shaped substantially the same, and combining the two one over the other forms the cartridge case 2. At one end of the cartridge case 2 is formed a wide disk freeing portion 7, which is concave in a substantially trapezoidal shape.

Outside the cartridge case 2 is slidably fitted a cylindrical shutter 8 for opening and closing the disk freeing portion 7. The planar shape of the shutter 8 also is substantially trapezoidal, matching the shape of the disk freeing portion 7, and over the side faces of the tip part of the shutter 8 is integrally formed via a thin hinge portion 10 an end blocking piece 9 to cover the end face of the disk freeing portion 7. The height of the end blocking piece 9 is about equal to the thickness of the cartridge case 2.

As shown in FIG. 15, a first link bar 11a and a second link bar 11b are provided on a side face of the shutter 8, one end of the first link bar 11a is rotatably linked to the side face of the shutter 8 while one end of the second link bar 11b is rotatably linked to the end blocking piece 9, and the other ends of the first link bar 11a and the second link bar 11b are connected to each other. The end of the first link bar 11a linked to the side face of the shutter is fitted with a helical spring (not shown), which elastically energizes the end blocking piece 9 all the time in the direction represented by the broken line, i.e. the direction of covering an end face of the disk freeing portion 7.

When the disk cartridge is not in use, the end blocking piece 9 is in a vertical state as shown in FIG. 9, and the disk freeing portion 7 of the cartridge case 2 is blocked by the shutter 8. When the disk cartridge is inserted into the disk drive unit, the shutter 8 automatically slides in the direction of an arrow Y, i.e. the direction reverse to that of disk cartridge insertion, and this move is accompanied by the shift of the end blocking piece 9 as well in a substantially horizontal state along the plane of the cartridge case 2. In a state in which the mounting of the disk cartridge in the disk drive unit has been completed, as shown in FIG. 10, FIG. 12 and FIG. 14, the disk freeing portion 7 is completely freed to expose the under face of the hub 1a. The open position of the shutter 8 is regulated by a stepwise stopper section 13 provided toward the rear end of the cartridge case 2. The shutter 8 has such a size that, even when it is in the open state, the end of the shutter 8 may not protrude from the cartridge case 2.

As described above, the disk freeing portion 7 is formed in a concave shape at the tip of the cartridge case 2 and, as shown in FIG. 10, the width L3 of the disk freeing portion 7 in the direction orthogonal to the shifting direction of the shutter on the inlet side (the direction of an arrow Y) is greater than ½ of the width L4 of the disk cartridge in the direction orthogonal to the shifting direction of the shutter (L3/L4>0.5, L3/L4=0.87 in the particular case of this embodiment).

By using a system in which the shutter 8 is slid in the same direction as that of disk cartridge insertion into the disk drive unit (the direction of the arrow Y), i.e. a system in which, when the disk cartridge is inserted into the disk drive unit, the shutter 8 shifts in the direction reverse to that of disk cartridge insertion as in the present invention, a large enough width L3 can be secured for the disk freeing portion 7 to expose about ¼ of the recording disk 1 in the circumferential direction in a state in which the shutter 8 is opened. In this state, the head (not shown) enters in the direction of arrow Z to pinch the exposed part of the recording disk 1 to start recording/reproducing of information. Since a substantial part of the recording disk 1 is exposed from the cartridge case 2, the head, will not collide against the cartridge case 2, even if it is considerably large.

When the disk cartridge is ejected from the disk drive unit, the shutter 8 automatically shifts in the direction reverse to the arrow Y. In the final state, as represented by the broken line in FIG. 15, the end blocking piece 9 is vertical, and the shutter 8 completely blocks the disk freeing portion 7. In order to smoothen the move of the end blocking piece 9 from the vertical to the horizontal state or vice versa along with the shifting of the shutter 8, a tapered or arcuate guide face 12 is formed at the angular tip of the first case portion 2a, and both ends of the end blocking piece 9 slide on this guide face 12.

As shown in FIG. 16, the saucer-shaped hub 1a, consisting of a magnetic body such as a magnetic stainless steel sheet, is stuck to the under face of the central part of the recording disk 1, and is fitted into a spindle insertion inlet 14 provided in the second case portion 2a.

A transparent hole 15 is formed at the center of the hub 1a, and a cap-shaped saucer 16 is arranged over the loophole 15, with a coil spring 17 intervening between the first case portion 2a and the saucer 16. An annular rib 18 is formed around the circumference of the spindle insertion inlet 14 provided in the second case portion 2a, and a flange 1b of the hub 1a is placed over the annular rib 18. When the disk cartridge is not in use, the spring force of the coil spring 17 causes the annular rib 18 to press the flange 1b via the saucer 16, and the recording disk 1 is held stably, without play, in an approximately central position of the internal space 5 of the cartridge case 2. The spring force of this coil spring 17 also causes the spindle insertion inlet 14 to be blocked by the hub 1a and, since the transparent hole 15 is blocked by the saucer 16, there is no fear of dust or the like invading the cartridge case 2.

In this embodiment, as shown in FIGS. 12 and 14, the size of the shutter 8 is so regulated that the shutter 8, when it is in the open position, may not protrude from the rear end of the cartridge case 2. For this reason, when the shutter 8 is in its open position, the rear end of the shutter 8 cannot fully cover the spindle insertion inlet 14 as shown in FIG. 7, and this poses a problem in protecting the spindle insertion inlet 14 from dust. Then, the dust-proof structure shown in FIG. 16 can solve this problem.

FIG. 17 shows a state in which the disk cartridge is loaded in the disk drive unit. The head of a spindle 20 provided on the disk drive unit is installed into the transparent hole 15, and a permanent magnet 20 integrally provided with the spindle 20 comes into contact with the hub 1a to thrust upward the hub 1a and the saucer 16 against the spring force of the coil spring 17, causing the flange 1b of the hub 1a to be detached from the annular rib 18. Then, the hub 1a is magnetically drawn by the permanent magnet 20 and the recording disk 1 is turned.

Although a hub 1a having the transparent hole 15 is used in this embodiment, it is also possible to use a hub 1a having a bottomed concave part in place of the transparent hole 15. In this case, the saucer 16 can be dispensed with, and the coil spring 17 is directly inserted into the concave part to press the hub 1a.

Figure 18:
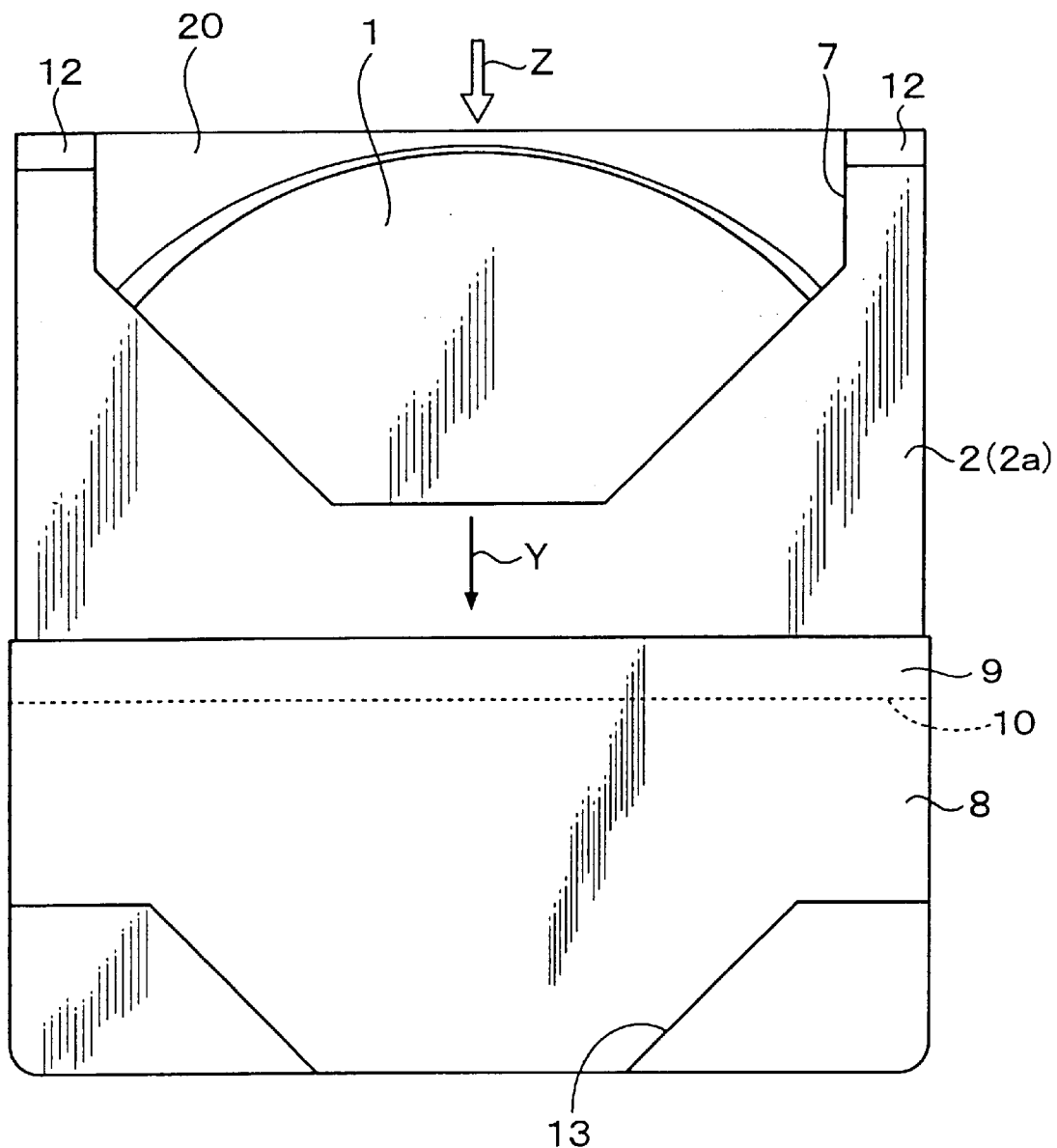
FIG. 18 is a plan of the disk cartridge, which is a third preferred embodiment of the invention, when in use.
Figure 19:
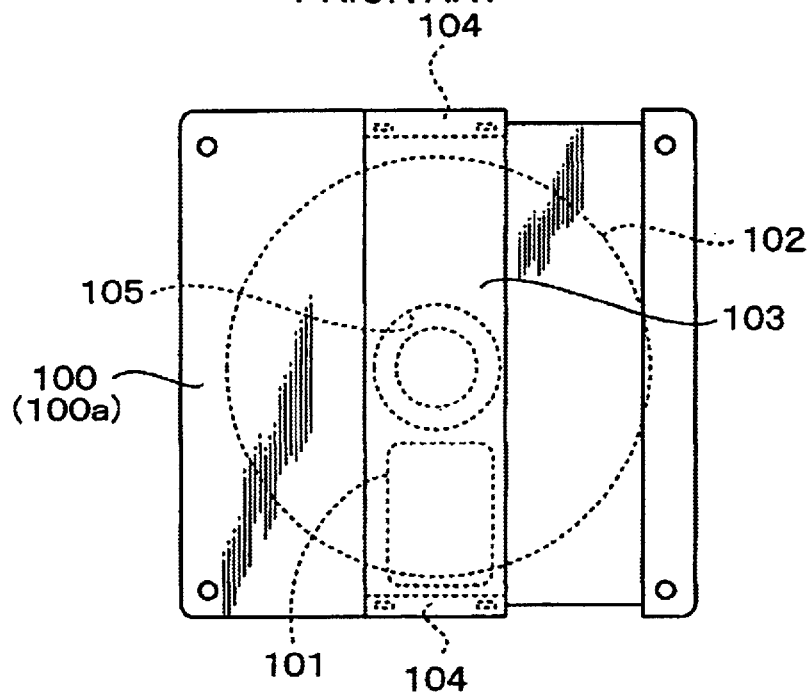
FIG. 19 is a plan of a disk cartridge proposed according to the prior art when not in use.
Figure 20:
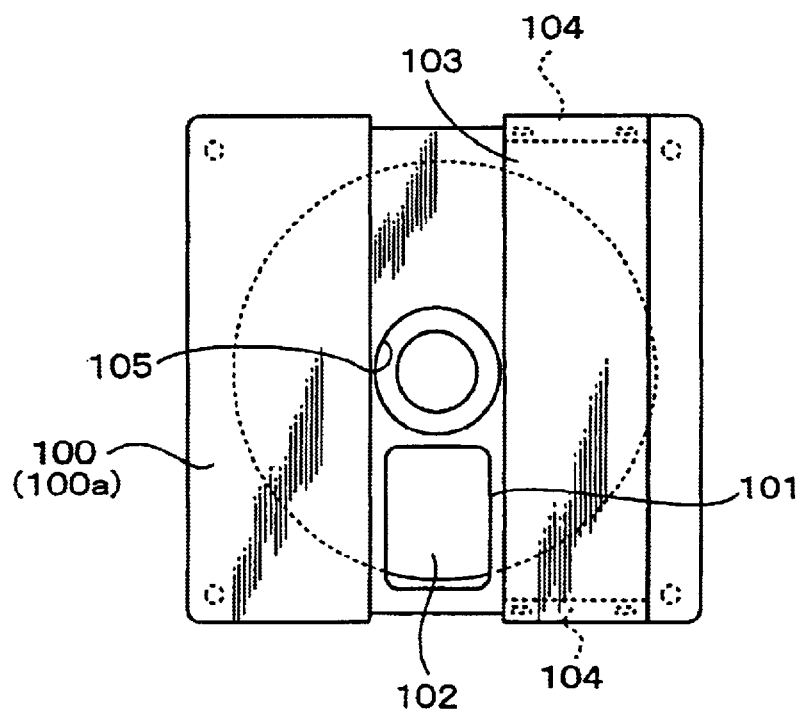
FIG. 20 shows a plan view of that disk cartridge according to the prior art when in use.

FIG. 18 is a plan of a third preferred embodiment of the present invention in a state in which the shutter 8 is open. This embodiment differs from the second embodiment shown in FIG. 10 in that a linking portion 20 about as thick as the recording disk 1 is provided at the tip of the cartridge case 2 so as to stride over the disk freeing portion 7 and the recording disk 1 is arranged inside this linking portion 20. The linking portion 20 serves to reinforce the tip of the cartridge case 2 and to protect it from deformation.

Using any of the above-described configurations, the present invention enables substantial parts of the two sides of the recording disk to be exposed from the cartridge case when the disk cartridge is in use, allowing recording/reproducing to take place without letting the head, even if it is considerably large, collide against the cartridge case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk cartridge, comprising:

a recording disk; and a cartridge case for accommodating the recording disk, wherein said cartridge case is divided on a plane thereof into at least a first case portion and a second case portion, and the second case portion is arranged slidable relative to the first case portion;

said recording disk is covered by the first case portion and the second case portion by keeping the first case portion and the second case portion in a parallel state when the disk cartridge is not in use; and, parts of both an inside face and an outside face of said recording disk are exposed from the cartridge case by moving the second case portion relative to the first case portion to form a disk freeing portion at a side of said cartridge case when the disk cartridge is in use.

2. The disk cartridge, as set forth in claim 1, wherein said second case portion is shiftable in a direction reverse to a direction of disk cartridge insertion into a disk drive unit.

3. The disk cartridge, as set forth in claim 2, wherein a ratio of a width L1 of the disk freeing portion in the direction orthogonal to a shifting direction of said second case portion to a width L2 of the disk cartridge in the direction orthogonal to the shifting direction of the second case portion (L1/L2) surpasses 0.5.

4. The disk cartridge, as set forth in any one of claims 1 to 3, wherein guide members protrude in parallel with each other in the same direction from both sides of said first case portion, and the second case portion is supported by the guide members and, by shifting the second case portion relative to the first case portion, the disk freeing portion is formed inside said guide members.

5. The disk cartridge, as set forth in claim 1, further comprising:

a side opening/closing lid, said side opening/closing lid being pivotably mounted to said first case portion to open and close a side of said cartridge case.

6. The disk cartridge, as set forth in claim 1, wherein said second case portion is located on a disk cartridge insertion side of said cartridge case, and said second case portion is slidable on said first case portion in a direction reverse to a direction of disk cartridge insertion into a disk drive unit.

7. The disk cartridge, as set forth in claim 1, wherein generally an entire side of said cartridge case is opened to form the disk freeing portion when the second case portion is moved relative to the first case portion.

8. A disk cartridge, comprising:

a recording disks; and a cartridge case for accommodating the recording disk, wherein parts of both an inside face and an outside face of said recording disk are exposed to form a disk freeing portion toward a tip of said cartridge case;

a shutter for opening and closing the disk freeing portion is shiftably fitted to said cartridge case so as to shift in a direction reverse to the direction of disk cartridge insertion into the disk drive unit; and a ratio (L3/L4) of a width L3 of the disk freeing portion in the direction orthogonal to a shifting direction of the shutter to a width L4 of the disk cartridge in the direction orthogonal to the shifting direction of the shutter surpasses 0.5.

9. The disk cartridge, as set forth in claim 8, wherein a size of said shutter does not permit said shutter to project from a rear end of the cartridge case when the disk freeing portion is opened.

10. The disk cartridge, as set forth in claim 9, wherein a stopper section for regulating an opening position of the shutter is provided at the rear end of said cartridge case.

11. The disk cartridge, as set forth in claim 9, wherein a spindle insertion inlet is formed in said cartridge case, and a hub is fitted in a central part of said recording disk and, when the disk cartridge is not in use, said hub blocks the spindle insertion inlet.

12. The disk cartridge, as set forth in claim 8, wherein said shutter is located on a disk cartridge insertion side of said cartridge case.

13. The disk cartridge, as set forth in claim 8, wherein generally an entire side of said cartridge case is opened to form the disk freeing portion when the shutter is in an open position.

14. The disk cartridge, as set forth in claim 8, wherein said shutter includes an end blocking piece, said end blocking piece being connected to a main portion of said shutter by a hinge portion, said end blocking piece being oriented in a vertical manner when said shutter is in the closed position and a horizontal manner when the shutter is in the open position.

15. A disk cartridge, comprising:

a recording disk; and a cartridge case for accommodating the recording disk, wherein parts of both an inside face and an outside face of said recording disk are exposed to form a disk freeing portion toward a tip of said cartridge case;

a shutter for opening and closing the disk freeing portion is shiftably fitted to said cartridge case so as to shift in a direction reverse to the direction of disk cartridge insertion into the disk drive unit; and a ratio (L3/L4) of a width L3 of the disk freeing portion in the direction orthogonal to a shifting direction of the shutter to a width L4 of the disk cartridge in the direction orthogonal to the shifting direction of the shutter surpasses 0.5; and an end blocking piece for covering sides of said disk freeing portion is provided at a tip of said shutter, the end blocking piece being elastically energized in the direction of covering the sides of the disk freeing portion.

16. A disk cartridge, comprising:

a recording disk; and a cartridge case for accommodating the recording disk, wherein parts of both an inside face and an outside face of said recording disk are exposed to form a disk freeing portion toward a tip of said cartridge case;

a shutter for opening and closing the disk freeing portion is shiftably fitted to said cartridge case so as to shift in a direction reverse to the direction of disk cartridge insertion into the disk drive unity; and a ratio (L3/L4) of a width L3 of the disk freeing portion in the direction orthogonal to a shifting direction of the shutter to a width L4 of the disk cartridge in the direction orthogonal to the shifting direction of the shutter surpasses 0.5; and a linking portion having substantially the same thickness as said recording disk is provided integrally toward a tip of said cartridge case so as to stride over the disk freeing portion.

* * * * *